Dec. 6, 1966 H. M. OGLE 3,290,508
PHOTOELECTRIC CORRELATION SYSTEM AND A TIME
DISPLACEMENT DISCRIMINATOR THEREFOR
Filed Jan. 27, 1961 4 Sheets-Sheet 1

Inventor:
Hugh M. Ogle,
by Charles W. Helzer
His Attorney.

Inventor:
Hugh M. Ogle,
by Charles W. Helzer
His Attorney.

Dec. 6, 1966 H. M. OGLE 3,290,508

PHOTOELECTRIC CORRELATION SYSTEM AND A TIME DISPLACEMENT DISCRIMINATOR THEREFOR

Filed Jan. 27, 1961 4 Sheets-Sheet 3

Inventor:
Hugh M. Ogle,
by Charles W. Helzer
His Attorney.

Inventor:
Hugh M. Ogle,
by Charles W. Helzer
His Attorney.

United States Patent Office 3,290,508

Patented Dec. 6, 1966

3,290,508
PHOTOELECTRIC CORRELATION SYSTEM AND A TIME DISPLACEMENT DISCRIMINATOR THEREFOR

Hugh M. Ogle, Palo Alto, Calif., assignor to General Electric Company, a corporation of New York Filed Jan. 27, 1961, Ser. No. 85,286
4 Claims. (Cl. 250—217)

The present invention relates to image recognition and, more particularly, to a method and apparatus for determining the degree with which a comparison object corresponds to a reference object.

The usual electronic system for image recognition now in common use operates upon the presence or absence of a signal or possibly on a simple variation in amplitude of the signal on a pick-up device sensitive to such properties as color, brightness of light, temperature of heated objects, frequency or phase of electrical quantity, or other similar characteristics. The degree of intelligence of such systems is greatly limited; however, and it is believed that there are many inspection and control problems that can be solved better by scanning an optical image of a field of view with a suitable electro-optical pick-up device, and comparing the information contained therein with information stored in an electronic or magnetic memory in such a way that similarities or differences are useful to generate control signals. These signals could then serve to identify objects, accept or reject objects moving past an inspection point, interpret information on labels or file cards, position objects, guide missiles to targets, and for many other control purposes.

A television camera performs the foregoing type of scan, but the amount of information contained in the resultant signal is so enormous and so much of it is irrelevant for recognition purposes that a simpler approach is indicated. When the human eye first observes an object, the over-all shape is probably the most important factor in establishing recognition. Most people have no difficulty in recognizing black and white photographs or outline drawings of common objects and such recognition is based largely upon shape rather than color, brightness, size, etc. Such fact suggests a logical solution to the problem.

It is therefore an object of my invention to provide a simplified image recognition method and apparatus for recognizing the outline characteristics of shape in an image by comparing it to the outline characteristics of a comparison image stored in a memory, and to generate control signals from the comparison operation.

A further object of the invention is to provide a new and improved time displacement discriminator circuit and a circuit which indicates the degree of correlation between random pulses of two signals with each signal including a series of such pulses.

In practicing the invention a system of image recognition is provided which includes a scanner designed to extract the minimum amount of information required from any given image in order to identify it to the extent desired. This economy of information obtained through the design of the scanner simplifies the correlation circuitry needed in the memory to achieve the degree of correlation required for positive identification. Effectively, the scanner passes a narrow slit across the scene to be examined so that a single passage of the slit across the field of view constitutes a complete scan. At every position of the slit light from all parts of the scene under the slit is averaged. The result at reasonable scan speeds is a minimum information time-varying signal of relatively small frequency spectrum. The basic control system provides relatively simple correlation circuitry capable of handling the minimum information signal developed by the scanner for measuring the elapsed time between similarities of two similar time-varying signals of this type. This is accomplished by an elementary time displacement discriminator which compares the signal with a similar signal coming from a memory stored image, and supplies an error signal which indicates the degree of similarity between the viewed image and the stored image. Because of these features a highly economic and yet effective image recognition system is made available.

The novel features which I believe to be characteristic of my invention are set forth with particularity in the appended claims. My invention itself, however, both as to its organization and method of operation together with further objects and advantages thereof may best be understood by reference to the following detailed description taken in connection with the accompanying drawings, wherein like parts in each of the several figures are given the same reference numeral, and wherein:

Figure 1:
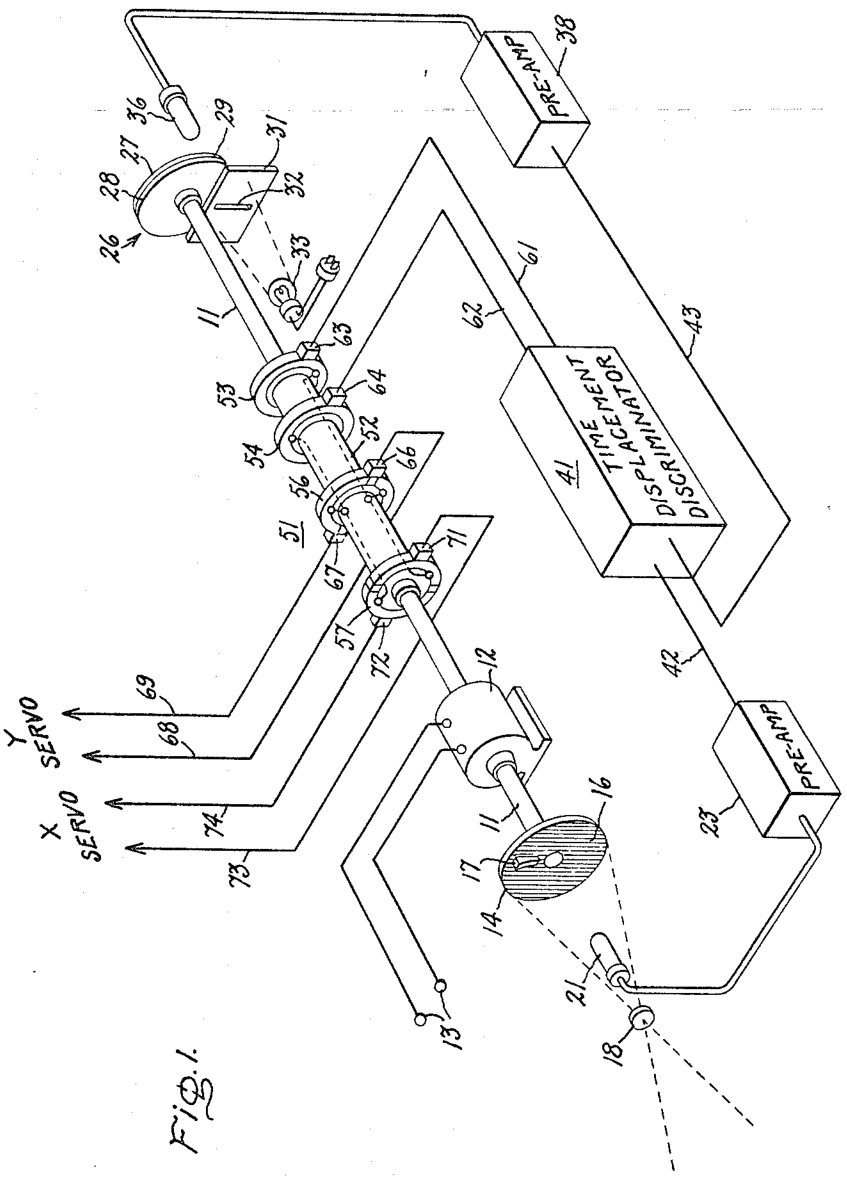
FIGURE 1 is a schematic representation, partly in block form, of one embodiment of my invention.

One embodiment of the invention is shown in FIGURE 1 which comprises a system for automatically controlling the flight of a freely moving missile so that having arrived within view of the target, the course of the missile is automatically maintained and corrected to exactly a desired predetermined spot. The system includes a rotatable shaft 11 which is suitably mounted and rotated by a motor 12 energized from a source of power indicated generally at 13. One end of shaft 11 has a disc 14 secured thereto which has a non-reflecting surface 16 formed by a coating of black paint, and a radially extending segmental scanning mirror 17 is mounted on the disc over a portion of this surface. A lens 18 positioned to view the target area (not shown) serves to focus a view of the target area upon the nonreflecting surface 16 of disc 14 including the segmental mirror 17. Thus, as disc 14 is rotated, a radial line scan of the target is generated by the segmental mirror 17 which reflects intercepted light to a pick-up device 21, such as a photocell that converts the light variations into corresponding electrical signals. For isolation and prevention of overloading of photocell 21, the electrical signals are applied to a conventional preamplifier 23, such as a single stage of amplification followed by a cathode follower.

A memory or stored image means is provided for the guidance system and may be a magnetic storage drum, or the like; however, the memory here described comprises a second disc 26 mounted at the other end of the rotatable shaft 11 and formed of two laminations of transparent material 27 and 28 such as glass or plexiglass, with a photographic transparency 29 therebetween. The transparent photograph 29 is a previously taken photograph of the target area, and is scanned by fixed mask 31 with a viewing slit 32 through which light passes from a source 33, such as an electric light bulb. A second photoelectric pick-up device 36, such as a photocell, receives light that passes through the transparency 29, and converts the light into electrical signals which are also applied to a conventional preamplifier 38, similar to preamplifier 23.

In accordance with my invention the output signals of preamplifiers 23 and 38 supplied through leads 42 and 43, respectively, are compared by a time displacement discriminator 41 (to be described more fully hereinafter) which generates a direct current output that is a function of the relative time of occurrence of the parts of the two signals which correspond, and does not produce any output from the random parts of the signals that do not correlate to a small degree. Additionally, the output of such time displacement discriminator 41 is zero if the corresponding parts of the two signals are in time coincidence. However, if the signals are displaced the polarity of the output depends on the relative direction of the displacement, as will be seen from the following discussion.

If the target image is displaced, with respect to the transparency 29, for instance in the upward direction, the output of discriminator 41 will have a cyclical variation around the scan revolution of the two discs since the displacement will make the image signal come eariler than the memory signal when the mirror segment 17 is moving downward and later when it is moving upward. Now, it will be seen that, if the connection to the output of the time displacement discriminator 41 is reversed at the top and bottom of each scan by a commutator switch, an output will be produced which has one polarity for upwards displacement of the image, and the opposite polarity for downwards displacement. This signal is suitable for steering the missile in a vertical or Y direction. By providing a commutator which reverses the connections when the signals of the two scan lines are horizontally displaced, a horizontal steering signal can be produced.

To provide the foregoing vertical and horizontal steering signal, a commutator arrangement 51 is connected to the shaft 11 as shown in FIGURE 1. A sleeve 52 is secured to the mid-portion of shaft 11 for rotation by the shaft, and carries two slip rings 53 and 54 and two commutator rings 56 and 57. The two slip rings 53 and 54 are continuous and insulated from sleeve 52, while the two commutator rings 56 and 57 each are divided into two semi-circular segments surrounding and insulated from sleeve 52. With segmental mirror 17 of disc 14 in an upper vertical position, as shown in FIGURE1, the insulation between the segments of the commutator ring 57 is disposed in a similar vertical position. At the same time the insulated portion between the two segments of commutator ring 56 is disposed in a horizontal plane and this relationship between the commutator rings 56 and 57 provides the necessary commutation to produce the required steering signals.

The output of time displacement discriminator 41 is respectively supplied by leads 61 and 62 through brushes 63 and 64 which engage the slip rings 53 and 54. The slip ring 53 is electrically connected to one of the segments of each of the commutator rings 56 and 57, and the slip ring 54 is similarly connected to the remaining segment of each of the commutator rings 56 and 57. Two brushes 55 and 67 engage opposite sides of the commutator ring 56 in the horizontal place to provide a voltage proportional to vertical displacement from the target by leads 68 and 69 to a Y axis servomotor (not shown) of the missile, and two similarly disposed brushes 71 and 72 engage commutator ring 57 to provide a voltage between two leads 73 and 74 for controlling the X axis servomotor (not shown) of the missile.

It is also to be noted that if the image be rotated with respect to the comparison transparency, the output of discriminator 41 will have a steady direct current component. The commutators convert this direct current component to an alternating current, which can be suitably filtered out of the circuit to the steering motors, and, if it proves desirable to maintain and control the rotational orientation of the missile, such direct current component can be used for such purpose. That is the missile may not only be steered by the servomotors toward the target but be maintained in correct roll orientation. For example, in horizontal flight it can be maintained right side up.

The commutator and direct current servomotors can, of course, be replaced with alternating current servomotors by comparing the phase of the A.C. component (at scan repetition frequency) of the output of discriminator 41 to a two-phase alternator (not shown) on the scanner shaft 11.

It is also feasible to replace the transparency and its scanning system with a magnetic drum on which is recorded electrical waves corresponding to the scan of the memory picture. Several tracks can be recorded on the drum to take care of the change in size of the target image with range closure by switching the memory from one track to the next as required.

In further consideration of the embodiment of the invention of FIGURE 1, it is desired to restate that the basic problem of the type of image recognition here described is reducible to the problem of measuring the lapsed time between similarities of two similar time varying complex signals and, depending upon the scanned object and the scanning mechanism, these signals will contain many different frequencies. If the signals consisted of simple pulses spaced in time, it would be relatively easy to construct a circuit to measure the time difference between corresponding pulses. If the signals consisted of sine waves of discrete frequencies, it would be relatively simple to construct a phase measuring type of circuit so that the time delay could be measured in electrical degrees. Many circuits have been devoped to measure phase, but for complex signals such as are encountered in the present recognition system phase cannot be defined, and the only characteristic of importance is time displacement between similarities in the two signals.

A circuit is desired that will give a definite indication of coincidence between the similarities of two signals and in addition a positive or negative error signal, respectively, corresponding to plus or minus time displacement of one signal with respect to the other. A solution to time displacement discrimination can be achieved by considering only the zero voltage intercepts of the two signals, i.e., the instant when the polarity of the signal reverses. By the means of a multivibrator trigger circuit, or a saturable transformer, a pulse can be produced whenever a signal swings through zero, or reverses polarity. If these pulses have a definite height and a duration time determined by the corresponding pulse in the opposite channel, they can be readily compared in time as by simple averaging or integrating circuits. If the signal in one channel produces a series of positive pulses whenever it reverses polarity and the signal in the other channel produces a series of negative pulses corresponding to its time of polarity reversal and all of these pulses, both negative and positive, are fed into a simple averaging circuit, a comparison signal will be produced.

Figure 3:
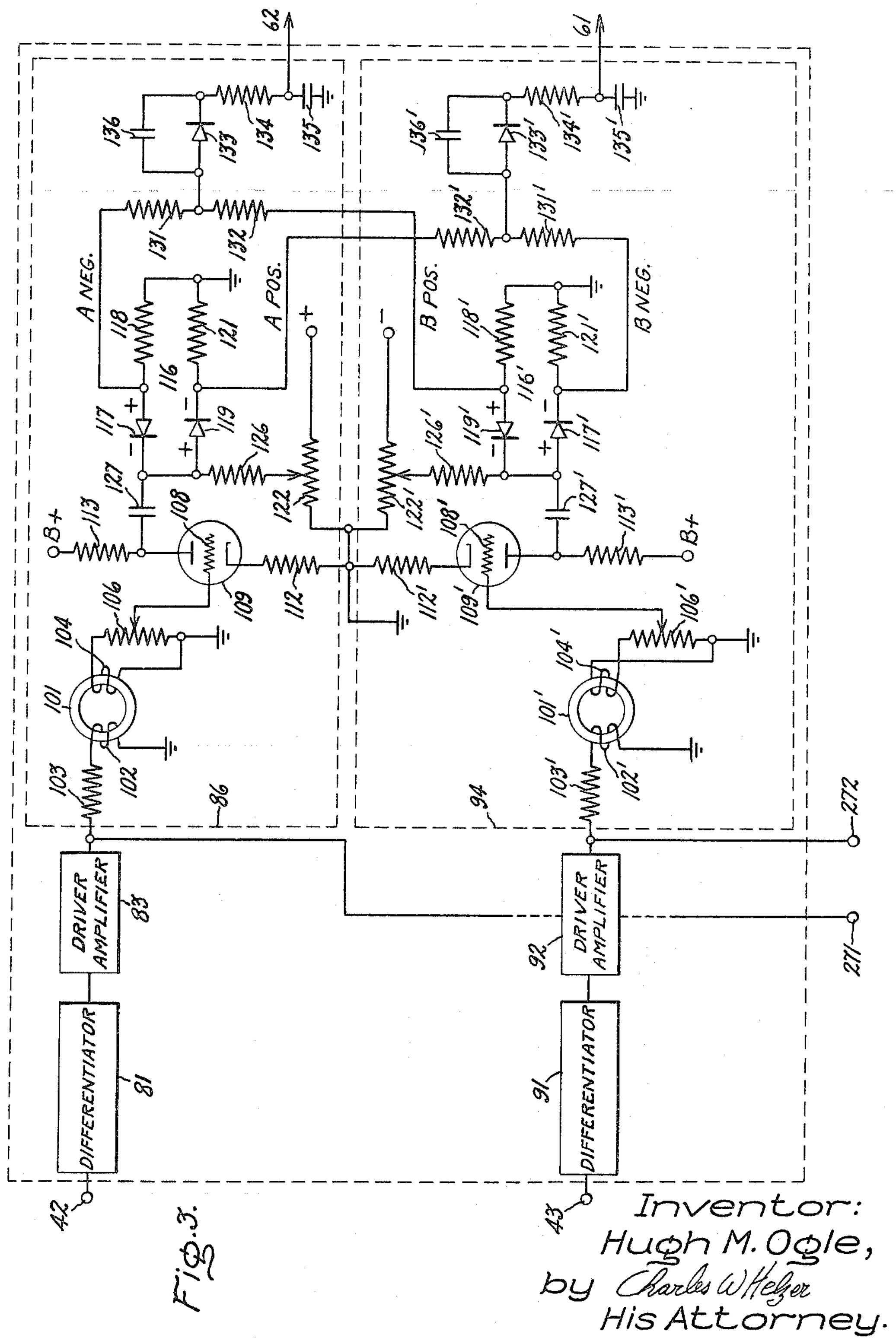
FIGURE 3 is a schematic diagram of the time displacement discriminator circuit used in the image recognition systems of FIGURES 1 and 2.

For the production of suitable error signals for the guidance of the missile, reference is made to the time displacement discriminator 41, as illustrated in detail in FIGURE 3 of the drawings. In the signal at the output of the preamplifiers 23 and 38, the gross aspects of the subject are predominant and the most predominant aspect is the fact that the view and transparency 29, as scanned, have a beginning and an end. However, recognition of the content of the picture is obtained from finer details which produce the higher frequency components of the signal. Hence, it is desirable to have available the higher frequency components alone, free of the large variations produced by the coarser parts of the picture. To this end, the output signal of the preamplifier 23 is differentiated by a differentiator 81, which is conventional in construction, and develops an output proportional to the rate of change of the input signals. The output of differentiator 81 is impressed by lead 82 upon the input of conventional driver amplifier 83 and, finally, the amplified signal is applied to an intercept pulse generator 86 to be described more fully hereinafter. A similar channel is provided for the quasi-random signals developed at photoelectric device 36, and comprises a differentiator 91, a driver amplifier 92, and an intercept pulse generator 94.

The elements of both intercept pulse generators 86 and 94 are the same and are given the same identifying number with those of the latter generator 94 being characterized by primes. Hence, only intercept pulse generator 86 will be described in detail and only those variations in connections and operation will be set forth with respect to generator 94. The intercept pulse generator includes a saturable core 101 which saturates easily, and the direction of the saturated flux reverses abruptly whenever the current supplied to a control winding 102 through a current limiting resistor 103 passes through zero in accordance with the differentiated signal. Thus, each time the flux of the core 101 reverses, a voltage pulse is induced in a readout winding 104 and supplied to an output resistor 106, one end of which is grounded. Output resistor 106 has a movable arm connected directly to the control grid 108 of a triode vacuum tube 109 having its cathode connected to ground through a current limiting resistor 112, and having its anode connected through a plate load resistor 113 to a source of positive plate potential. The triode 109 thus connected comprises a buffer amplifier, and serves principally as an isolation means between secondary winding 104 and subsequent circuitry.

To develop suitable pulses of a given polarity, for example, negative-going pulses at the output terminal of the time displacement discriminator, a clipper circuit 116 is provided, and comprises two parallel connected series circuits formed by a first diode rectifier 117 connected for current flow in one direction through a resistor 118, and a second diode rectifier 119 connected for current flow in the opposite direction through a resistor 121. A potentiometer 122 serves as a voltage divider between a source of positive voltage 123 and a negative terminal which is grounded. The positive bias voltage developed across potentiometer resistor 122 is supplied through a resistor 126 to the pair of parallel connected series circuits. The pulsed waveform signal appearing across the plate load resistor 113 of electron tube 109 is supplied to the parallel series circuit through a coupling capacitor 127. Clipped output pulses obtained from the circuit are supplied to an output network comprised by a pair of series connected resistors 131 and 132 having one of its terminals connected across resistor 118 and the other terminal connected across a corresponding resistor 118' in the intercept pulse generator 94. The junction of the two resistors 131 and 132 is connected to a rectifying and filtering network comprised by a diode 133, a resistor 134 and a capacitor 135 with the diode 133 having a capacitor 136 connected in parallel circuit relationship across it. The output signals are obtained across the capacitor 135 and supplied through an output terminal 62.

The connections of elements of intercept pulse generator 94 are the same as described for intercept pulse generator 86 with three exceptions. One exception embodies a reversal of connections between secondary winding 104' of core 101' and resistor 106' so that signals crossing the zero axis in the same direction in both generators 86 and 94 produce pulses of opposite polarity in the two secondary windings 104 and 104'. The second exception is embodied in the connection of the potentiometer 122', which is made to a negative terminal 123' of a source of potential (not shown) instead of the previously described positive connection for potentiometer 122 of the first intercept pulse generator 86 so that positive pulses are passed to lead 61 by coupling capacitor 131'. The third exception is in the connection of the output resistor 132' back across the resistor 121 in contrast to the connection of resistor 132 across resistor 118, and in the connection of resistor 131' across resistor 121' in contrast to the connection of resistor 131 across resistor 118.

Consider now the operation of the embodiment of FIGURE 1, as the missile nears its target and various components are energized to assume flight direction. Both discs 14 and 26 are rotated in synchronism by motor 12 and signals corresponding to the varget view are developed by photoelectric device 21 and supplied through lead 42 to the time displacement discriminator 41, and reference signals corresponding to the transparency 29 of the target developed by the photoelectric device 36 are supplied to the time displacement discriminator through lead 43. The random pulses supplied through lead 42 are differentiated by the differentiator 81 and then amplified by the drive amplifier 83 to produce a series of pulses which are both negative and positive in polarity and which are proportional to the rate of change of the random pulses as they cross the reference or zero axis each time the random pulses change direction. The differentiated signal pulses are then impressed upon the primary winding 102 of saturable core 101 which produces a voltage pulse each time the direction of saturation of the core reverses as the polarity of the signal impressed upon the primary winding 102 passes through zero. At each reversal a pulse of voltage is induced in secondary winding 104 which has an amplitude that is primarily a function of the rapidity with which the core excitation is carried through zero. Hence, the pulses produced in the output winding 104 by the essentially random input are all possible heights up to a maximum established by the core material and windings but have frequency or repetition rate determined by the repetition rate of the differentiated pulses supplied thereto from differentiator 81. The pulses next pass through the triode buffer stage 109 which serves to isolate the secondary winding 104 from the clipper circuit 116. In general, input control resistor 106 is adjusted so that the greatest possible pulse amplitude is obtained at the anode of the tube 109 without clipping the tops of the highest peak values of the pulses.

The diodes 117 and 119 are biased by the potentiometer 122 so that in operation, without impressed pulses no current flows through diode 117, but does flow through diode 119, hence positive-going pulses at the anode of tube 109 are effectively passed through resistor 121 to ground, and negative-going pulses at the anode 114 of the tube 109 produce a negative-going voltage developed across the resistor 118 at its junction with diode 117, which is then coupled to the lead 62 as a negative pulse.

Operation of differentiator 91, driver amplifier 92 and pulse intercept generator 94, with respect to the random pulses impressed by lead 43 from preamplifier 38 is substantially the same as that described in the foregoing with respect to the random pulses supplied from the preamplifier 23 to differentiator 81. Two exceptions occur, one because of the reverse connection between the secondary winding 104' of the saturable core 101' and the resistor 106', so that pulses crossing through the zero axis in the same direction produce pulses of opposite polarity to those developed by the secondary winding 104 of the saturable core 101. The other exception occurs because of the negative bias applied to the cathode of the diode 119' in the clipper circuit 116'. Such negative bias results in conduction through diode 119' and a resistor 118' of the clipper circuit at all times at a substantially constant rate until a positive-going signal appears at the anode 114' of the tube 109'. The positive-going signal or pulse results in raising the cathode potential of the diode 119' so that conduction through such diode is less than was previously in existence; however, diode 117' is made conductive by the positive-going pulse and current flows through resistor 121' to ground and a positive-going pulse is developed and coupled to the output lead 61 through capacitor 136'.

Thus, a differential voltage exists between leads 62 and 61 as impressed upon slip rings 53 and 54 and, since the differential voltage is also impressed upon commutator rings 56 and 57, no voltage difference will exist between the two halves of the respective commutator rings as long as the positive-going and negative-going pulses are in time correspondence. This condition occurs when the missile is properly guided to the target so that the target image and the transparency image are producing similar trains of random pulses as scanned.

If, however the target image is displaced upward, i.e., in the Y direction with respect to the transparency as scanned, the image signal from disc 14 will come earlier than the memory signal when the sector 17 is moving downward, i.e, in the Y direction and later when it is moving upward, as shown in FIGURE 1. Thus, a difference voltage proportional to the displacement is impressed between halves of commutator ring 56, and, since it is reversed during each rotation of shaft 11, a direct current error signal is applied by leads 68 and 69 to the Y servomotor to correct for the vertical displacement, whether up or down.

Since a similar situation exists with respect to the horizontal or X direction at the top and bottom of the cyclical scan, a similar error signal is developed across the halves of commutator rings 57 for application by leads 73 and 74 to the X servomotor and correction of horizontal displacement, whether right or left.

While the species of the invention disclosed in FIGURE 3 of the drawings employs a single differentiating circuit 81 and 91 in each signal channel, to obtain the first derivative of the signals supplied thereto, it is possible that higher order derivatives, such as the second, third or $n^{th}$ derivatives of the signal can be obtained in order to take advantage of the finer detail of the image. To do this it is necessary that the circuit of FIGURE 3 be modified to include two, three or $n$ differentiating circuits, whichever the case may be, connected in series circuit relationship between the input terminals 42 and 43 and each of these differentiating circuits would be connected to driver amplifiers and intercept pulse generator, the outputs of which would be averaged.

Figure 2:
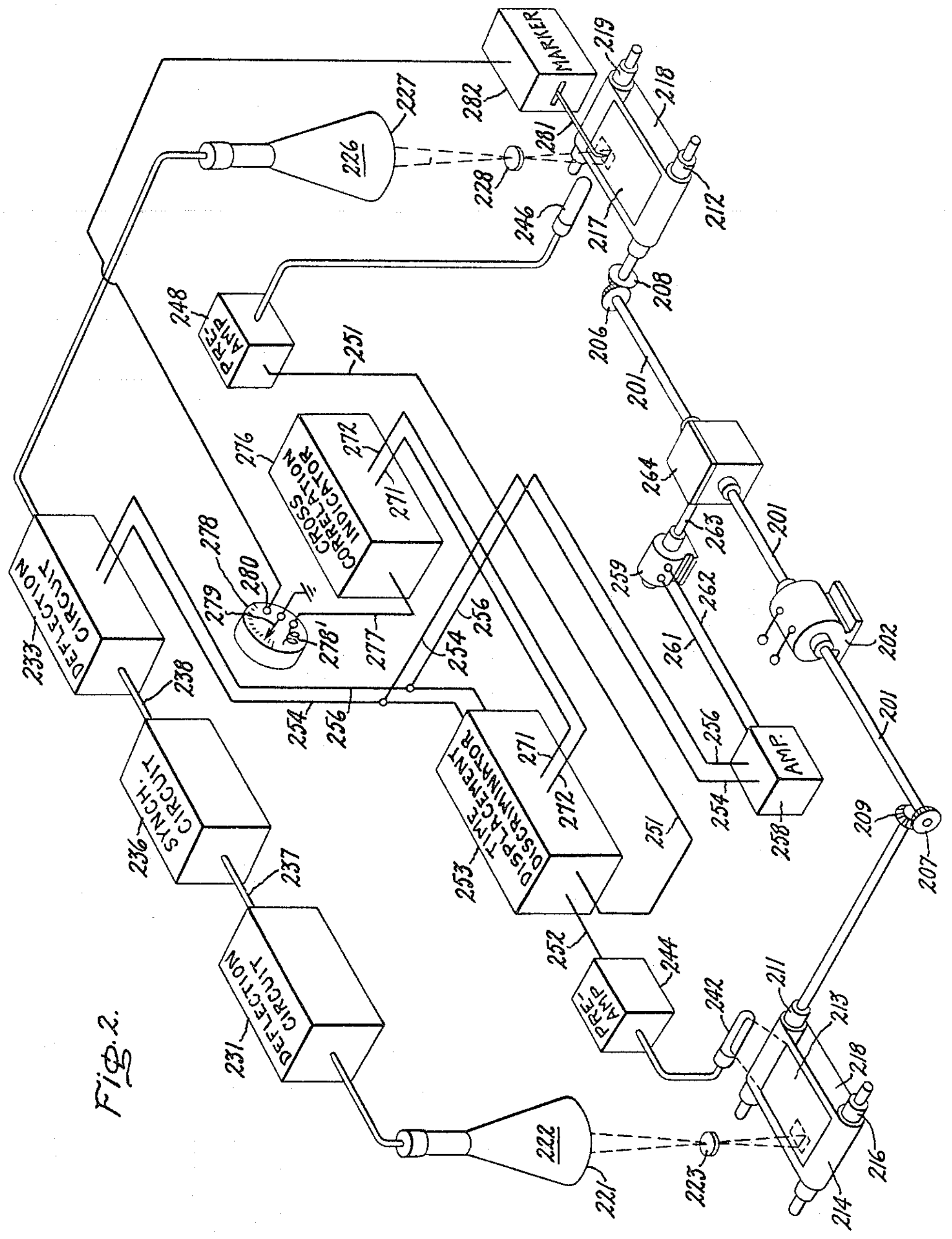
FIGURE 2 is a schematic circuit diagram of a second form of image recognition system constructed in accordance with the invention.

A second embodiment of my invention is illustrated in FIGURE 2 and also provides means for comparing two images. It is customary in military reconnaissance to take aerial photographs of a critical area at frequent intervals and compare them with previous pictures of the same area to determine whether any enemy installations have appeared. The comparison is now made visually and may involve large numbers of photographs. Many people are thus involved in painstaking work which is of a tedious nature conducive to errors and such work could be performed faster and more reliably by image recognition equipment. In order to facilitate automatic image inspection the present embodiment of the invention was developed. In this embodiment of the invention, each picture is scanned with a projected moving line of light from a cathode ray tube with reflected light being converted to corresponding electrical signals by a photoelectric pick-up. The scanned area can be additionally moved by control of the deflection circuits from a director (not shown) other than provided by conventional deflection circuits so that the entire picture can be covered. The electrical signal corresponding to the pictures supplied from the photoelectric pick-up are fed to a time displacement discriminator, the output of which modifies the deflection on the picture being compared to keep its sweep precisely on the same area of the picture as that being scanned on the master or reference picture. The signals are also fed to a cross correlation indicator, the ouput of which is arranged to mark the picture whenever something is seen which does not correspond to the master picture.

To accomplish the foregoing, drive shaft 201 in FIGURE 2 is driven by motor 202 and power from the shaft 201 is transmitted through bevel gears 206 and 207, mounted thereon, which engage matching bevel gears 208 and 209 that are shafted two rollers 211 and 211, respectively. An earlier taken master picture 213 is mounted on a continuous belt 214 for movement by roller 211, and is held in a scanning position by a spaced-apart idler roller 216. Also, a later taken picture 217 to be compared is mounted on a similar continuous belt 218 for movement by roller 212, and is held in a scanning position by a spaced-apart idler roller 219. Thus, by energizing the motor 202 the two pictures 213 and 217 are moved in synchronism and by proper initial mounting of the pictures the proper relationship between selected areas to be scanned is maintained.

In order to scan the master picture there is provided cathode ray tube 222 with its screen 221 disposed to confront master picture 213 and light from the screen is focussed upon the picture by a lens 223 positioned therebetween. A similar arrangement is provided with respect to the picture 217 whereby a cathode ray tube 226 has its screen 227 disposed to confront the picture 217 and a lens 228 is positioned therebetween for focussing light from the tube upon the picture.

To control the electron beam of cathode ray tube 222, a conventional deflecting circuit 231 provides necessary operating voltages and sweep signals, and a similar deflection circuit 233 is connected to cathode ray tube 226. For synchronizing the operation of the two deflection circuits 231 and 233, a synchronizing circuit 236 of conventional construction supplies synchronizing signals to each of the deflection circuits 231 and by cable 238 to deflection circuit 233. Thus, with such an arrangement the cathode ray tubes 222 and 226 both operate in synchronism and each picture is scanned with a projected moving line of light from the respective cathode ray tube.

A first photoelectric tube 242 is positioned to view the scanned area of the picture 213 to convert light variations reflected therefrom into corresponding electrical signals and to supply these signals to a conventional preamplifier 224. A second photoelectric device 246 is positioned to view the scanned area of picture 213 to similarly convert light variation reflected therefrom into electrical signals and cable 246 carries operating potential and signal to a second preamplifier 248. The two preamplifiers 244 and 248 are provided for isolation and supply their outputs through conductors 251 and 252, respectively, to a time displacement discriminator 253, which is identical with that illustrated in FIGURE 3, and described in detail with respect to the embodiment of FIGURE 1.

The differential output signal developed by the time displacement discriminator 253 is impressed by leads 254 and 256, respectively, upon the deflection circuit 233 associated with the scanning of sample picture 217 which is being examined for variations from the master 213. This differential signal is utilized to alter the deflection potentials applied to the cathode ray tube area to cause the light beam of cathode ray tube 226 to track the area of picture 217 being scanned in synchronism with the scanning of the master picture 213 by cathode ray tube 222.

Also, the differential signal from the time displacement discriminator 253 is supplied through leads 254 and 256 to the input of a differential amplifier 258 which controls the operation of a direct current motor 259. By means of this arrangement, the differential amplifier 258 energizes the synchronizing motor 259 which drives a differential gear box 264 that in turn rotates shaft 201 at a faster or slower speed so that a change in the position of the comparison picture 217 with respect to the master picture 213 is achieved.

An additional feature of the second embodiment of the invention is provided by a cross-correlation indicator which has the outputs of the time displacement discriminator 253 supplied thereto through a pair of leads 271 and 272. The cross-correlation indicator 276 multiplies together the two received signals from the output of the driver amplifier and provides an output at lead 277, which is applied to the actuating coil of a conventional contact-making instrument 278. When the two scanned areas of the master picture and comparison picture correspond, or are alike, then a relatively high current flows in conductor 277 and in actuating coil 278' of instrument 278.

This coil is, therefore, energized and deflects the index 279 to the left and out of engagement contact 280. When the two areas are not in correspondence, or are unlike, then the current in conductor 277 reduces and may cause index 279 to engage contact 280 thereby closing an actuating circuit through marker 282 causing marker arm 281 to engage the picture and to mark the area of non-correspondence.

Figure 4:
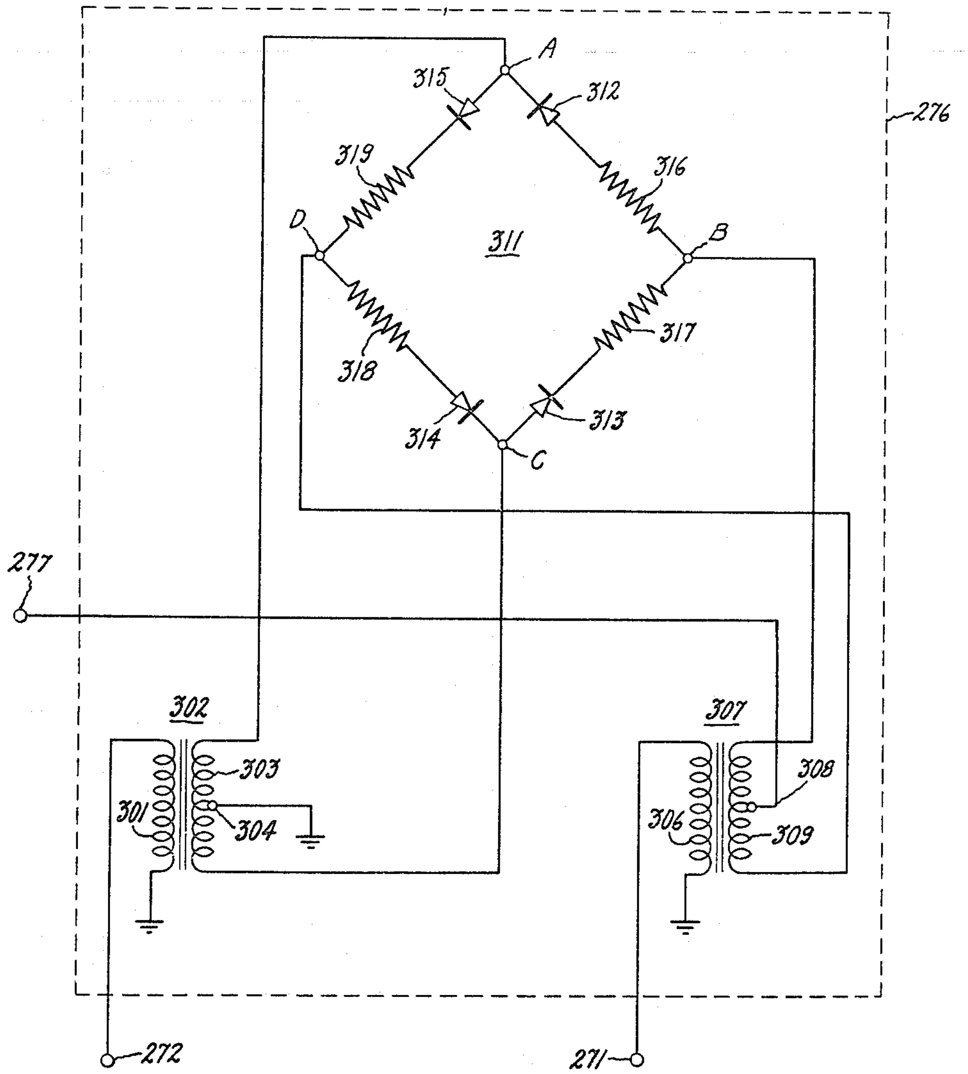
FIGURE 4 is a schematic diagram of the cross correlation indicator of FIGURE 2.

Referring now to FIGURE 4 of the drawings, there is illustrated a circuit diagram of the cross-correlation indicator 276 wherein primary winding 301 of input transformer 302 receives the differentiated and amplified signal supplied by lead 272 from the time displacement discriminator 353 shown in FIGURE 3. The secondary winding 303 of transformer 302 has a center tap 304 which is grounded, and provides a push-pull voltage between end turns thereof which is connected to diagonally opposite terminals A and C of a bridge 311.

Similarly, the output signal of time displacement discriminator 253 across the conductor 277 to primary winding 306 of an input transformer 307 having a center tapped secondary winding 309 that is connected through a lead 277 to the contact-making instrument 280 is shown in FIGURE 2. The voltage induced across secondary winding 309 is impressed between diagonally opposite points B and D of bridge 311. This bridge comprises a conventional ring demodulator 311 which combines the two input signals as developed across secondary windings 303 and 309 and comprises series connected unidirectional conducting devices 312–315 and equal resistances 316–319, with the devices so poled that current can circulate in only one direction around the bridge circuit.

Now, with the voltage across secondary winding 303 impressed between opposite corners A and C of ring demodulator 311, current can flow from A to D to C for one polarity of signal and from C to B to A for the other polarity. Similarly, with the voltage across secondary winding 309 impressed between the other two corners B and D of the bridge circuit, a path for current exists from B to A to D for one polarity of signal and from D to C to B for the other polarity. The output of the cross-correlation indicator 276 is a voltage between center taps 308 and 304 with numerous current paths therebetween depending upon the relative polarities of the correlating and non-correlating portions of the input signals. While the theory of operation of a ring modulator having sine wave inputs is well known, the present device operates with input signals which are of the random type with some degree of correspondence or not, depending upon the nature of the images. However, it has been found in operation that the output voltage appearing across lead 277 connected to center tap 304 is a direct current voltage of one polarity for combinations of random portions of input signals having some degree of correlation but zero for non-correlating portions thereof.

Now consider the operation of the embodiment of the invention shown in FIGURE 2 as described, with suitably aligned master and comparison pictures 213 and 217 in place. Each picture 213 and 217 is separately and synchoronously scanned by a moving line of light from associated cathode ray tubes 222 and 226. Scanning of consecutive areas across the width of the pictures 213 and 217 may be controlled by adjustment of the deflection circuits 231 and 233 from a director (not shown), and movement along the pictures may be controlled by energization of motor 202.

Reflected light from the pictures 213 and 217 is respectively converted to corresponding electrical signals by photoelectric pick-up devices 242 and 246 and the amplified series of random pulses of each signal are separately applied to time displacement discriminator 253. As previously described with respect to the embodiment of the invention shown in FIGURE 1, time displacement discriminator 253 develops a differential output corresponding to the degree of time coincidence of the individual random pulses of the two signals. Absolute coincidence of random pulses of both signals results in a zero output voltage whereas displacement of comparison picture 217 with respect to master picture 213 results in an output voltage having a polarity corresponding to the direction of displacement.

For minor corrections of displacement between the two pictures 213 and 217 the differential voltage output of time displacement discriminator 253 is applied to deflection circuit 233 of cathode ray tube 226 which is associated with comparison picture 217 to alter the beam deflection of the cathode ray tube 226 to overcome the direction of displacement. To correct for more serious or severe displacements between the two pictures 213 and 217 the differential voltage output of time displacement discriminator 253 is also impressed upon direct current motor 259 through differential amplifier 258. The inertia of motor 259 and associated differential gearbox 264 renders its action slower than the electronic control of the preceding paragraph and therefore is not active for minor displacements which are rapidly corrected by the referenced system. However, for displacements of substantial proportions and longer durations, motor 259 operates through differential gearbox 264 and associated mechanical coupling to move comparison picture 217 in a direction to correct the displacement without affecting the position of master picture 213.

The differentiated and amplified signals of time displacement discriminator 253 are impressed by leads 271 and 272 upon cross-correlation indicator 276 which develops an output voltage the magnitude of which depends on the degree of correlation between the two signals. For signals between which there is no degree of correlation, the output current in conductor 277 drops to zero and contact-making instrument 278 closes contact between index 279 and contact 280 thereby completing a circuit to energize marker 282. Arm 281 is then lowered to place a mark on comparison photograph 217 and indicate the particular scanned area where correlation with master picture 213 is absent.

Thus, by suitable control of drive motor 202 and deflection circuits 231 and 233 of respective cathode ray tubes 222 and 226, the entire comparison picture 217 may be rapidly scanned to determine those areas of the picture which do not correlate or correspond to similarly located areas of master picture 213.

The principles outlined in the foregoing with respect to the embodiments of FIGURES 1 and 2 are equally applicable to other types of systems as, for example, recognition of typed and handwritten messages and addresses, document sorting, filing, inspection and sorting of equipment and material, with the only difference being in the design of the equipment being controlled to accomplish the desired final result. In other words, by utilizing the basic components of FIGURES 1 and 2, the signal developed by the time displacement discriminator and by the cross-correlation indicator may be applied to accomplish desired results in many types of image recognition systems. Further, it is believed obvious that by the inclusion of three image correlation systems such as shown in FIGURE 1 or FIGURE 2, with each system being properly oriented to view a target object along a respective dimensional axis, it is possible to derive output error signals from all three systems which provide a three dimensional effect. The advantage of such a three dimensional system would be that it would minimize distortion effects and would provide additional information upon which to base recognition of three dimensional objects.

While two particular embodiments of this invention have been disclosed, it is to be understood that the invention it not limited thereto since many modifications, both in the circuit arrangement and in scanning methods and in the instrumentalities employed, may be made. It is contemplated by the appended claims to cover any such modifications as fall within the true spirit and scope of this invention.

What I claim as new and desire to secure by Letters Patent of the United States is:

1. In a correlation system, the combination comprising a reference object and a comparison object, first and second cathode ray devices respectively disposed adjacent said objects for synchronous scanning with beams of light, first and second photoelectric devices respectively disposed to convert radiation from said objects into corresponding series of pulses related to gross aspects of said objects, differentiating means coupled to each of said photoelectric devices to develop corresponding series of pulses porportional to the rate of change of said pulses, discriminator means connected to said differentiating means for developing a differential error signal in response to time displacement between individual proportional pulses of both series, said discriminator means connected to one of said cathode ray devices for correspondingly altering the area of scan in response to said differential signal, and correlating means coupled to said differentiating means for developing a signal corresponding to the degree of correlation between said objects.

2. In a correlation system, the combination comprising a reference object and a comparison object, first and second cathode ray devices respectively disposed adjacent said objects for synchronous scanning with beams of light, mechanical means coupled between said objects for equal movement thereof from original orienting positions, first and second photoelectric devices respectively disposed to convert light from said objects into corresponding series of pulses related to gross aspects of said objects, differentiating means coupled to each of said photoelectric devices to develop corresponding series of pulses proportional to the rate of change of said pulses, discriminator means connected to said differentiating means for developing a differential error signal in response to time displacement between individual proportional pulses of both series, said discriminator means coupled to one of said cathode ray devices for electronically changing the area of scan of said object and reduce said error signal, said discriminator also coupled to a motor to drive a differential included in said mechanical means to reduce said error signal, and correlating means coupled to said differentiating means for developing a signal corresponding to the degree of correlation between said objects.

3. In a time displacement discriminator for two series of random pulses, the combination comprising two channels having separate inputs for receiving said two series of pulses and a single output, each channel including differentiating means connected to respective inputs for developing corresponding series of pulses proportional to rate of change of said random pulses, intercept pulse generating means for providing a pulse each time said differentiated pulses pass through a reference potential, said pulse generating means of one channel being reversed with respect to the other, and clipping means coupled between said pulse generating means and said output, said clipping means of one channel passing only pulses of one polarity and said clipping means of the other channel passing only pulses of the opposite polarity, whereby a differential signal is developed at said output corresponding to the time displacement relationship between random pulses of both series of pulses.

4. In a time displacement discriminator for two series of random pulses, the combination comprising two channels having separate inputs for receiving said two series of pulses and a single output, each channel including differentiating means connected to respective inputs for developing corresponding series of pulses proportional to rate of change of said random pulses, intercept pulse generating means having a transformer with easily saturated core and connected to said differentiating means for developing a pulse each time said proportional pulses pass through a reference potential, the transformer of one channel having connections reversed with respect to the other, diode clipping means coupled between said transformer and said output, said clipping means of one channel passing only negative-going pulses and the clipping means of the other channel passing only positive-going pulses, whereby a differential error signal is developed at said output corresponding to the time displacement relationship between random pulses of both series of pulses.

References Cited by the Examiner

UNITED STATES PATENTS

| | | | |
|---|---|---|---|
| 2,939,110 | 5/1960 | Beattie et al. | 340—149 |
| 2,952,075 | 9/1960 | Davis. | |
| 2,964,266 | 12/1960 | Fuchs | 244—14 |
| 2,964,639 | 12/1960 | Hobrough. | |
| 2,964,644 | 12/1960 | Hobrough | 343—5 |
| 2,975,403 | 3/1961 | Doersan | 340—149 |
| 3,041,011 | 6/1962 | Dhanes | 244—14 |

RALPH G. NILSON, *Primary Examiner.*

CHESTER L. JUSTUS, SAMUEL W. ENGLE, KATHLEEN CLAFFY, *Examiners.*

A. E. HALL, L. L. HALLACHER, J. D. WALL, *Assistant Examiners.*